(12) United States Patent
Redford

(10) Patent No.: US 6,931,518 B1
(45) Date of Patent: Aug. 16, 2005

(54) BRANCHING AROUND CONDITIONAL PROCESSING IF STATES OF ALL SINGLE INSTRUCTION MULTIPLE DATAPATHS ARE DISABLED AND THE COMPUTER PROGRAM IS NON-DETERMINISTIC

(75) Inventor: John Redford, Cambridge, MA (US)

(73) Assignee: ChipWrights Design, Inc., Waltham, MA (US)

( * ) Notice: Subject to any disclaimer, the term of this patent is extended or adjusted under 35 U.S.C. 154(b) by 533 days.

(21) Appl. No.: 09/724,196

(22) Filed: Nov. 28, 2000

(51) Int. Cl.$^7$ .............................................. G06F 15/00
(52) U.S. Cl. ...................................... 712/234; 712/13
(58) Field of Search .............................. 712/13, 15, 22, 712/233, 234, 236, 20, 21

(56) References Cited

U.S. PATENT DOCUMENTS

| | | |
|---|---|---|
| 4,101,960 A | 7/1978 | Stokes et al. |
| 4,138,720 A | 2/1979 | Chu et al. |
| 4,181,942 A | 1/1980 | Forster et al. |
| 4,410,939 A | 10/1983 | Kawakami |
| 4,434,461 A | 2/1984 | Puhl |
| 4,435,758 A | 3/1984 | Lorie et al. |

(Continued)

FOREIGN PATENT DOCUMENTS

| | | |
|---|---|---|
| EP | 0 314 277 | 5/1989 |
| EP | 0 552 816 | 7/1993 |
| EP | 0 679 991 | 11/1995 |
| EP | 0 945 783 | 9/1999 |
| EP | 0 681 236 | 11/2000 |
| GB | 2 201 015 | 8/1988 |
| JP | 10-289305 | 10/1998 |
| JP | 2002-007359 | 1/2002 |
| WO | WO 87/00318 | 1/1987 |
| WO | WO 91/19269 | 12/1991 |
| WO | WO 93/04438 | 3/1993 |
| WO | WO 99/14685 | 3/1999 |

OTHER PUBLICATIONS

John L. Hennessy et al., "Enhancing Vector Performance," Computer Architecture a Quantitative Approach, Second Edition, Section B5, pp. B23–B29, 1996.
Single–Bit Processor Enable Scheme, IBM Technical Disclosure Bulletin, Apr. 1987, vol. 29 No. 11, pp. 5016–5017.
Banerjee et al., "Fast execution of loops with IF statements", IEEE vol. 84, pp 126–132 (1984).
"Single–Bit Processor Enable Scheme", IBM Technical Disclosure Bulletin, vol. 29, No. 11 (Apr. 1987).
Hennessey et al., "Enhancing Vector Performance", Computer Architecture, a Qualitative Approach, Second Edition, Section 5, pp B23–B29 (1996).
Levinthal et al., "Chap—A SIMD Graphics Processor" Computer Graphics, vol. 18, No. 3 (Jul. 1984).
Abstract search, pp 1–329, dated Mar. 21, 2003.
Abstract search, pp 1–7, dated Mar. 21, 2003.
Abstract search, pp 1–82, dated Mar. 21, 2003.

*Primary Examiner*—Eddie Chan
*Assistant Examiner*—Tonia L. Meonske
(74) *Attorney, Agent, or Firm*—Fish & Richardson P.C.

(57) ABSTRACT

A method of determining whether datapaths executing in a computer program should execute conditional processing block includes determining whether processor enable (PE) states of all of the datapaths are disabled, and branching around the conditional processing if the PE states of all of the datapaths are disabled. Branching is not performed, even if the PE states of all of the datapaths are disabled, if the program is determined to be deterministic. That determination is made by evaluating the state of a deterministic bit. Instructions are also provided for carrying out the determining and branching operations. The instructions may also be combined with operations that maintain the PE states during conditional processing.

11 Claims, 2 Drawing Sheets

U.S. PATENT DOCUMENTS

| | | | |
|---|---|---|---|
| 4,592,013 A | 5/1986 | Prame | |
| 4,604,695 A | 8/1986 | Widen et al. | |
| 4,679,140 A | 7/1987 | Gotou et al. | |
| 4,773,038 A | 9/1988 | Hillis et al. | |
| 4,873,626 A * | 10/1989 | Gifford | 710/120 |
| 4,992,933 A | 2/1991 | Taylor | |
| 5,021,993 A | 6/1991 | Matoba et al. | |
| 5,038,282 A | 8/1991 | Gilbert et al. | |
| 5,045,995 A | 9/1991 | Levinthal et al. | |
| 5,111,389 A | 5/1992 | McAuliffe et al. | |
| 5,121,498 A | 6/1992 | Gilbert et al. | |
| 5,136,697 A | 8/1992 | Johnson | |
| 5,224,214 A | 6/1993 | Rosich | |
| 5,230,079 A | 7/1993 | Grondalski | |
| 5,276,895 A | 1/1994 | Grondalski | |
| 5,361,367 A | 11/1994 | Fijany et al. | |
| 5,430,854 A | 7/1995 | Sprague et al. | |
| 5,479,624 A | 12/1995 | Lee | |
| 5,497,478 A | 3/1996 | Murata | |
| 5,524,223 A | 6/1996 | Lazaravich et al. | |
| 5,542,074 A | 7/1996 | Kim et al. | |
| 5,551,039 A | 8/1996 | Weinberg et al. | |
| 5,555,386 A | 9/1996 | Nomura | |
| 5,590,283 A | 12/1996 | Hillis et al. | |
| 5,590,356 A | 12/1996 | Gilbert | |
| 5,604,913 A | 2/1997 | Koyanagi et al. | |
| 5,608,886 A | 3/1997 | Blomgren et al. | |
| 5,638,533 A | 6/1997 | Law | |
| 5,659,722 A | 8/1997 | Blaner et al. | |
| 5,659,778 A | 8/1997 | Gingold et al. | |
| 5,666,519 A | 9/1997 | Hayden | |
| 5,684,973 A | 11/1997 | Sullivan et al. | |
| 5,696,958 A | 12/1997 | Mowry et al. | |
| 5,737,572 A | 4/1998 | Nunziata | |
| 5,752,068 A | 5/1998 | Gilbert | |
| 5,758,112 A | 5/1998 | Yeager et al. | |
| 5,758,176 A | 5/1998 | Agarwal et al. | |
| 5,778,241 A | 7/1998 | Bindloss et al. | |
| 5,805,915 A | 9/1998 | Wilkerson et al. | |
| 5,822,606 A | 10/1998 | Morton | |
| 5,848,290 A | 12/1998 | Yoshida et al. | |
| 5,870,581 A | 2/1999 | Redford | |
| 5,872,987 A | 2/1999 | Wade et al. | |
| 5,924,117 A | 7/1999 | Luick | |
| 5,933,650 A | 8/1999 | van Hook et al. | |
| 5,946,222 A | 8/1999 | Redford | |
| 5,991,857 A | 11/1999 | Koetje et al. | |
| 6,049,330 A | 4/2000 | Redford | |
| 6,052,703 A | 4/2000 | Redford | |
| 6,067,609 A | 5/2000 | Mecker et al. | |
| 6,076,158 A | 6/2000 | Sites et al. | |
| 6,121,905 A | 9/2000 | Redford | |
| 6,130,631 A | 10/2000 | Redford | |
| 6,175,892 B1 | 1/2001 | Sazzad et al. | |
| 6,211,864 B1 | 4/2001 | Redford | |
| 6,216,223 B1 | 4/2001 | Revilla et al. | |
| 6,282,623 B1 | 8/2001 | Halahmi et al. | |
| 6,282,628 B1 | 8/2001 | Dubey et al. | |
| 6,292,879 B1 | 9/2001 | Fong | |
| 6,381,668 B1 | 4/2002 | Lunteren | |
| 6,404,439 B1 | 6/2002 | Coulombe et al. | |
| 6,452,864 B1 | 9/2002 | Condemi et al. | |
| 6,473,339 B2 | 10/2002 | De Ambroggi et al. | |
| 6,487,651 B1 | 11/2002 | Jackson et al | |

* cited by examiner

BRANCHING AROUND CONDITIONAL PROCESSING IF STATES OF ALL SINGLE INSTRUCTION MULTIPLE DATAPATHS ARE DISABLED AND THE COMPUTER PROGRAM IS NON-DETERMINISTIC

CROSS-REFERENCE TO RELATED APPLICATIONS

This application is related to a copending application entitled HANDLING CONDITIONAL PROCESSING IN A SINGLE INSTRUCTION MULTIPLE DATAPATH PROCESSOR ARCHITECTURE, which was filed on the same day as this application and is incorporated herein by reference.

TECHNICAL FIELD

This invention relates to handling conditional processing in a single instruction multiple datapath (SIMD) processor architecture.

BACKGROUND

Parallel processing is an efficient way of processing an array of data items. A SIMD processor is a parallel processor array architecture wherein multiple datapaths are controlled by a single instruction. Each datapath handles one data item at a given time. In a simple example, in a SIMD processor having four datapaths, each data item in a four data item array would be processed in a respective one of the four datapaths.

During program execution in the SIMD processor, multiple datapaths may be enabled prior to encountering a conditional processing block, such as an if-then-else-processing block. Before executing the conditional processing block, the processor enable (PE) states of each of the datapaths, i.e., whether they are enabled or disabled, must be saved in case any of the datapath PE states is changed during execution of the conditional processing block. Further, upon exiting the conditional processing block, the PE states of the datapaths must be restored to the states that existed prior to entry of the conditional processing block.

SUMMARY

In a general aspect, the invention features a method of determining whether datapaths executing a computer program should execute conditional processing in the computer program. The method includes determining whether PE states of all of the datapaths are disabled, and branching around the conditional processing if the PE states of all of the datapaths are disabled. Instructions are also provided for performing the determining and the branching.

In a preferred embodiment, branching is not performed if the program is determined to be deterministic.

The determination of whether the PE states of all of the datapaths are disabled includes evaluating a processor enable bit associated with each one of the datapaths. The processor enable bit is enabled if it is a value of one. The processor enable bit is disabled if it is a value of zero.

The determination of whether the computer program is deterministic includes evaluating a deterministic bit. The deterministic bit is a first value to indicate that the computer program is deterministic, and is a second value to indicate that the computer program is non-deterministic.

In another aspect, the invention features instructions that combine the branching with operations that maintain the PE states during the conditional processing. One such instruction causes the datapaths to establish a state of the datapaths' PE states for the conditional processing, determine whether the established PE states are all disabled, and branch around the conditional processing if the established PE states of all of the datapaths are disabled.

The conditional processing is, e.g., an if-processing block, and in this case the instructions also cause the datapaths to save a current state of the PE states prior to establishing them for the conditional processing. The conditional processing may also include an else-processing block.

Embodiments of various aspects of the invention may have one or more of the following advantages.

If all datapaths are disabled prior to entering an if-processing block or an else-processing block, there is no work to be accomplished in these blocks. Therefore, branching around the work allows the program to run faster. Combining the branching operation with operations that maintain the PE states during conditional processing provides faster, more efficient program execution, and simpler programming.

Testing a deterministic indicator provides a manner of overriding the branching in program code that must meet real time deadlines.

Other features and advantages of the invention will be apparent from the description and drawings, and from the claims.

DESCRIPTION OF DRAWINGS

Like reference symbols in the various drawings indicate like elements.

DETAILED DESCRIPTION

Figure 1:
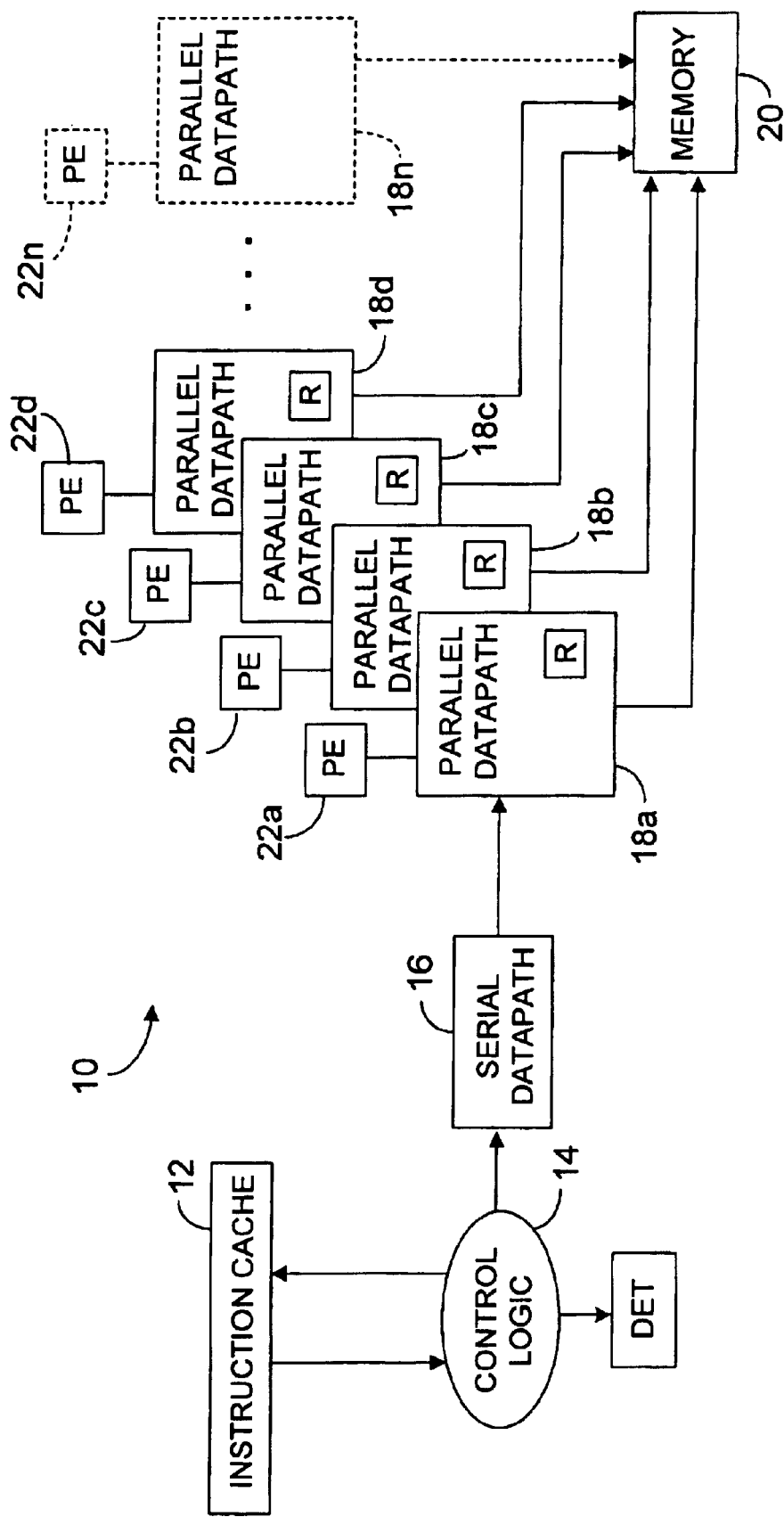
FIG. 1 is a block diagram of a single instruction multiple datapath (SIMD) processor.

Referring to FIG. 1, a single instruction multiple datapath (SIMD) processor 10 includes an instruction cache 12, control logic 14, a serial datapath 16, and a number of parallel datapaths labeled 18a, 18b, 18c, 18, . . . 18n. The parallel datapaths 18 write to a memory 20. Each of the datapaths 18 has an associated processor enable (PE) bit 22 that represents the PE state of that datapath. Specifically, parallel datapath 18a is associated with a PE bit 22a, parallel datapath 18b is associated with a PE bit 22b, and so forth. When a PE bit is enabled, its associated parallel datapath is enabled and data items may be written by that parallel datapath. For example, if PE bit 22a is enabled, data items may be written by parallel datapath 18a; if PE bit 22b is enabled, data items may be written by parallel datapath 18b. If PE bit 22n is enabled, data items may be written by parallel datapath 18n. When a PE bit is disabled, its associated parallel datapath is disabled and data items may not be written by that parallel datapath.

In operation, the control logic 14 fetches an instruction from the instruction cache 12. The instruction is fed to the serial datapath 16 that provides the instruction to the datapaths 18. Each of the datapaths 18 is read together and written together unless the processor enable bit is disabled for a particular datapath.

When an instruction causes the SIMD processor 10 to execute a conditional processing block within the program code (e.g., a processing block that includes one or more if-then-else processing statements), the current PE state of each of the datapaths must be accounted for, so that if any of the PE states of the datapaths are altered during execution of the conditional processing block, the PE states can be restored upon the completion of the conditional processing block. Often, a conditional processing block contains multiple conditional processing operations, some of which may be executed during (i.e., nested within) the processing of other conditional processing operations. In order to assure proper operation, the PE state of each datapath must be saved prior to entering each nested conditional operation, and the saved PE state must be restored upon completing the conditional operation.

Figure 2:
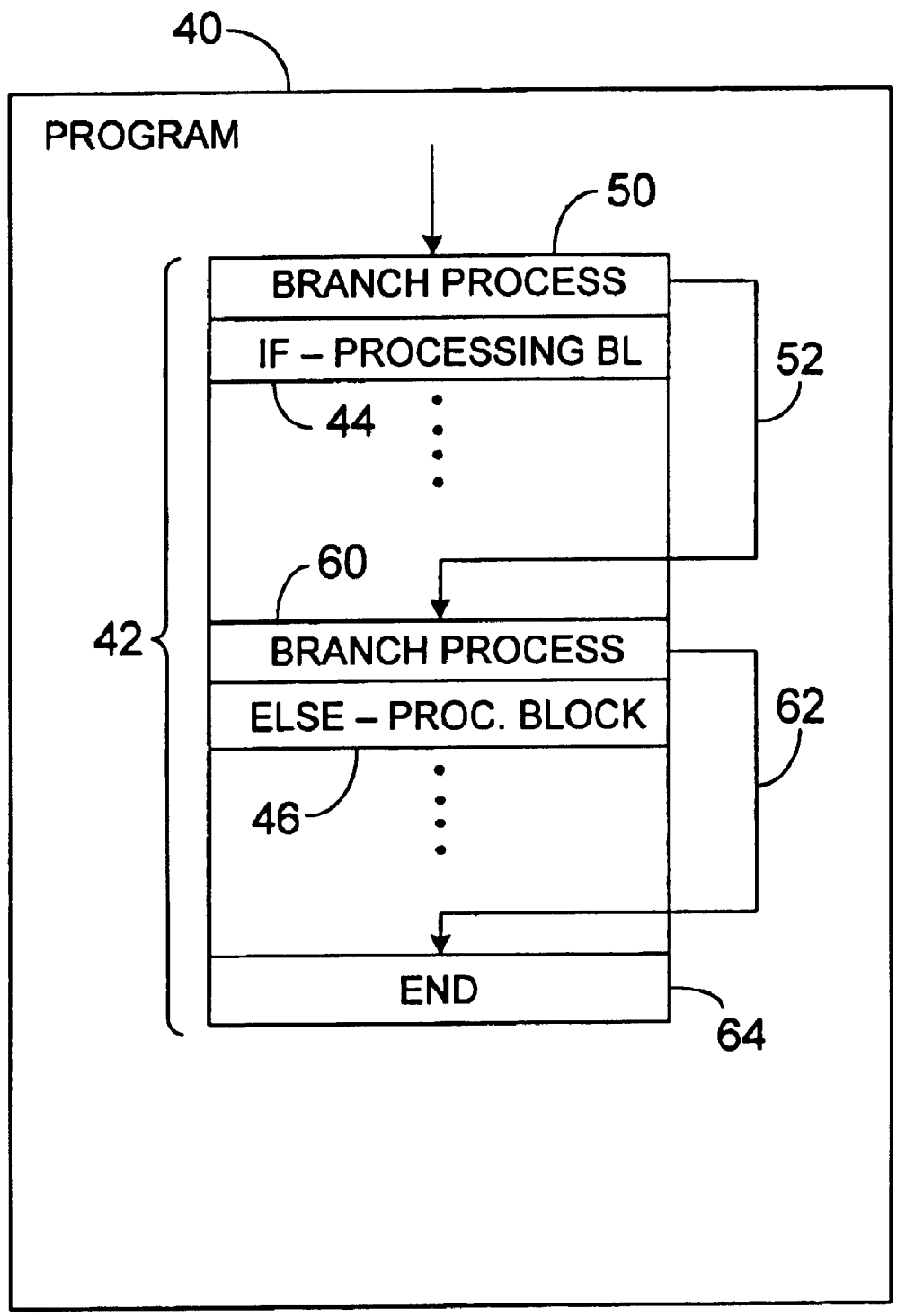
FIG. 2 is a block diagram of a program having branch processes for skipping conditional processing in some situations.

Referring to FIG. 2, program code 40 that contains a conditional processing block 42 is shown. Conditional processing block 42 is an if-then-else processing block in this example, and thus includes an if-processing block 44 followed by an else-processing block 46. It will be understood that program code 40 may contain many other conditional processing blocks 42, and indeed, conditional processing block may include additional if-processing blocks 44 and/or else-processing blocks 46 nested within it. A single conditional processing block with one if-processing block 44 and one else-processing block 46 is shown merely for simplicity in describing an embodiment of the invention.

At the start of if-processing block 44, the current PE states of datapaths 18 are saved, and an if-processing statement is executed. The PE states of datapaths 18 are then set to either the enable state (PE=1) or the disable state (PE=0) according to the results of the if-processing statement. Only those datapaths having an enabled PE state will perform subsequent processing in if-processing block 44. Accordingly, if all datapaths 18 are set to the disabled PE state, no processing work will be performed within if-processing block 44.

Branch process 50 is inserted in program code 40 at the start of if-processing block 44. Branch process 50 tests the PE states of datapaths 18 upon the execution of the if-processing statement. If all datapaths are disabled (i.e., PE=0), the processing operation in if-processing block 44 may be skipped without affecting the computational results of program 40. Accordingly, branch process 50 branches 52 around if-processing block 44 to else-processing block 46.

The PE states of datapaths 18 are also tested at the start of else-processing block 46. If all datapaths 18 are disabled (i.e., PE=0), no processing work will be performed within else-processing block 46. Accordingly, branch process 60 branches 62 around else-processing block 46 to, in this example, the end 64 of conditional processing block 40.

In some cases, the execution of program 40 is deterministic. That is, for one reason or another (such as to meet real-time deadlines), it is desirable to execute program 40 in the same amount of time regardless of whether any work in the program (such as if-processing block 44 and/or else-processing block 46) could be skipped. If so, a deterministic bit (DET, FIG. 1) is set by the programmer in a control register of SIMD processor 10. Branch processes 50, 60 test the state (0 or 1) of the DET bit and do not branch 52, 62 if the DET bit is set.

The copending application describes methods of saving and maintaining the PE states of datapaths 18 during conditional processing, such as if-then-else processing. Branch processes 50, 60 combine the branching determination with the PE state setting and maintaining operations, to provide instructions that respectively handle all of the work needed for an if-processing statement and an else-processing statement.

Branch process 50 combines the PE state saving operation with the branching operation, and is of the following form:

if (SAVE_PE (Px), PE=Pn=0) go to X

Branch process 50 saves the PE state of the datapaths in register Px, and then sets the PE state equal to the contents of register Pn. If those contents are 0 (i.e., if none of the datapaths' PE bits are set), branch process 50 branches 52 to destination X (e.g., the subsequent else-processing block 46).

As described in the copending application, a datapath's PE state is, under some conditions, inverted (i.e., from 0 to 1 or 1 to 0) prior to an else-processing block. The instruction for doing so is called a "FLIP" instruction in the copending application. Branch process 60 combines the FLIP instruction with the branching operation, and is of the following form:

if (FLIP_PE (Px)) go to Y

Branch process 60 will invert the appropriate PE bits (according to the rules described in the copending application) and will branch to destination Y (i.e., the end 64 of else-processing block 46) if none of the PE bits are set.

Other embodiments are within the scope of the following claims.

For example, branch processes 50, 60 may be used with other instructions that save and manipulate PE states during conditional processing.

Another branch process may be inserted at the start of conditional processing block 42 to determine whether the current PE states of all datapaths 18 (i.e. the PE states prior to performing any conditional processing statement) are disabled. If all PE states are disabled, none of datapaths 18 will perform either if-processing block 44 or else-processing block 46. Accordingly, this branch process will branch around the entire conditional processing block 42. As with branch processes 50, 60, branching is not performed if the deterministic bet DET is set.

Embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of determining whether a plurality of datapaths executing a computer program should execute conditional processing in the computer program, comprising:
   determining whether processor enable states of all of the datapaths are disabled;
   determining whether the computer program is deterministic; and
   branching around the conditional processing if the processor enable states of all of the datapaths are disabled and the computer program is non-deterministic.

2. The method of claim 1 wherein determining whether the processor enable states of all of the plurality of datapaths are disabled comprises:
   evaluating a processor enable bit associated with each one of the plurality of datapaths.

3. The method of claim 2 wherein the processor enable bit is enabled if it is a value of one.

4. The method of claim 2 wherein the processor enable bit is disabled if it is a value of zero.

5. The method of claim 1 wherein determining whether the computer program is deterministic comprises evaluating a deterministic bit.

6. The method of claim 5 wherein the deterministic bit contains a first value indicating the computer program is deterministic.

7. The method of claim 5 wherein the deterministic bit contains a second value indicating the computer program is non-deterministic.

8. A method of determining whether datapaths in a program should execute a conditional processing block in the program, the method comprising:
   storing states of the datapaths;
   determining whether all the datapaths are disabled based on stored states of the datapaths;
   determining whether the program is non-deterministic;
   branching around the conditional processing block if all the datapaths are disabled and if the program is non-deterministic;
   executing the conditional processing block if all the datapaths are not disabled; and
   setting the states of the datapaths to stored states of the datapaths following executing the conditional processing block.

9. An instruction set that is stored in a machine-readable medium and that is executable by datapaths during conditional processing, the instruction set comprising one or more instructions to:
   store states of the datapaths;
   determine whether all of the datapaths are disabled based on stored states of the datapaths;
   determine whether the program is non-deterministic;
   branch around the conditional processing if all of the datapaths are disabled and if the program is non-deterministic;
   execute the conditional processing block if all the datapaths are not disabled; and
   set the states of the datapaths to stored states of the datapaths following executing the conditional processing block.

10. The method of claim 8, wherein storing and branching are executed via a single instruction.

11. The instruction set of claim 9, wherein storing and branching are executed via a single instruction.

* * * * *